(12) United States Patent
Kim et al.

(10) Patent No.: US 7,679,038 B2
(45) Date of Patent: Mar. 16, 2010

(54) OPTICAL PHASE MICROSCOPE USING ROTATING 1/4 WAVELENGTH PLATE WITH PINHOLE IN THE CENTER POSITION AND FOURIER TRANSFORMED LENS

(75) Inventors: Dug Young Kim, Gwangju (KR); Ji Yong Lee, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 0 days.

(21) Appl. No.: 12/350,809

(22) Filed: Jan. 8, 2009

(65) Prior Publication Data
US 2009/0184240 A1 Jul. 23, 2009

(30) Foreign Application Priority Data
Jan. 18, 2008 (KR) ............. 10-2008-0005810

(51) Int. Cl.
*G02B 7/04* (2006.01)
(52) U.S. Cl. .................. 250/201.3; 250/208.1
(58) Field of Classification Search .......... 250/201.3, 250/208.1, 458.1, 459.1, 311; 356/123, 226, 356/457–479, 497–520; 382/134, 255; 359/372, 359/375, 385, 368, 387, 494–499
See application file for complete search history.

(56) References Cited

U.S. PATENT DOCUMENTS
3,052,152 A * 9/1962 Koester .................. 359/386
2003/0160968 A1 8/2003 Deck OTHER PUBLICATIONS
Gabriel Popescu et al., "Fourier phase microscopy for investigation of biological structures and dynamics," Optics Letters, Nov. 1, 2004, pp. 2503-2505.

* cited by examiner

Primary Examiner—Que T Le

(57) ABSTRACT

An optical phase microscope using rotating-¼ wavelength plate with pinhole in the center position and Fourier transformed lens is provided. The optical phase microscope comprises an optical image generator that acquires images for a specimen to be observed, an object plane onto which light beams of the images acquired from the optical image generator are projected, a first transform lens that performs primary Fourier transformation on the light beams passing through the object plane, a ¼ wavelength plate with pinhole at the center position that is positioned to be spaced by a focal distance of the first transform lens from the first transform lens, a secondary transform lens that performs secondary Fourier transformation on the light beams passing through the ¼ wavelength plate, and a phase image generator including a photo detector on which the images of the light beams subjected to the secondary Fourier transformation is focused.

7 Claims, 2 Drawing Sheets

[FIG. 1]
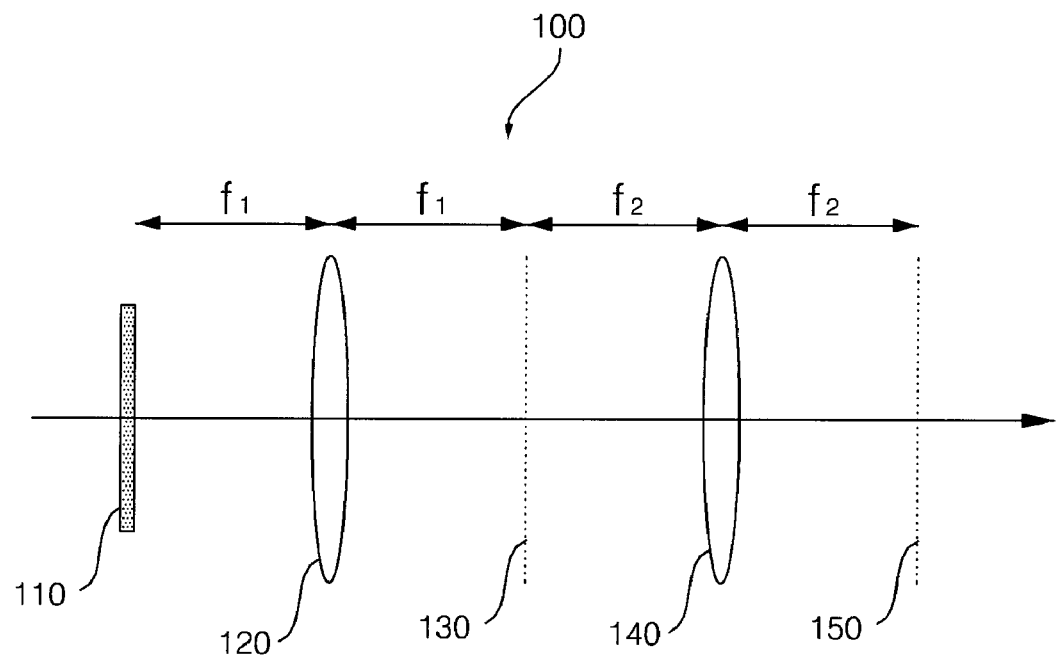
[FIG. 2]
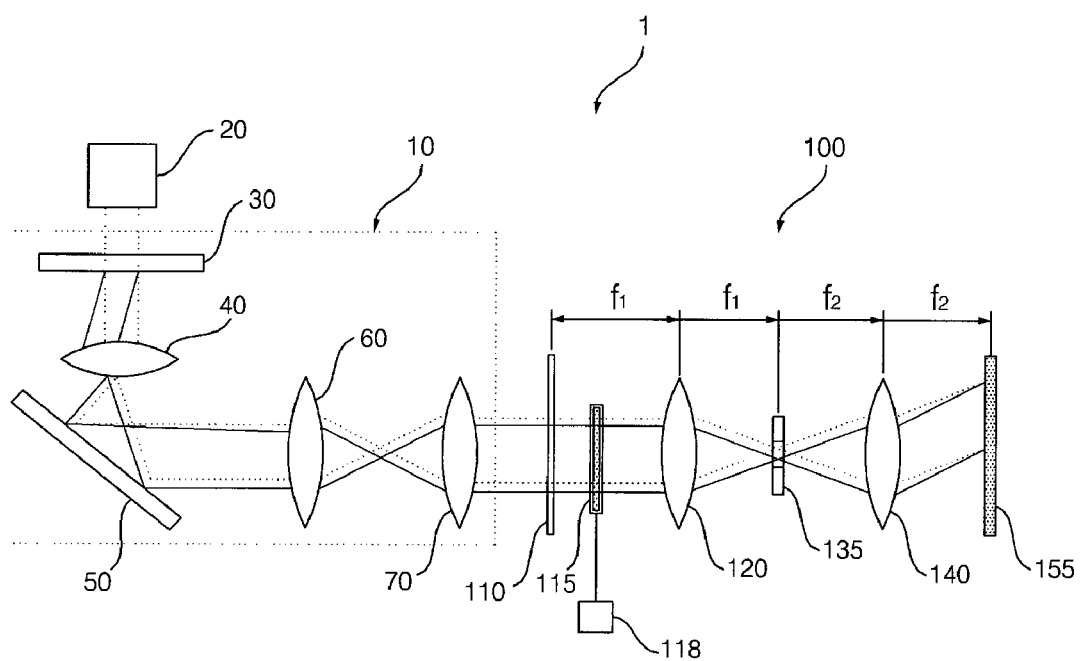

[FIG. 3]
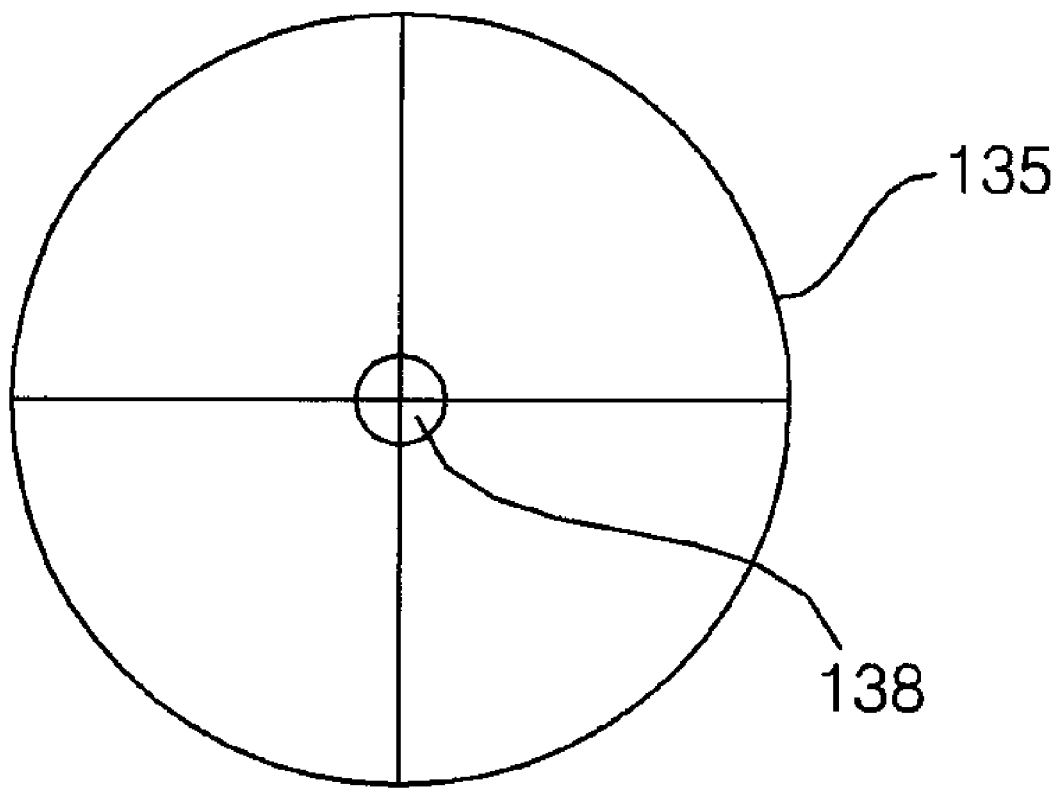

OPTICAL PHASE MICROSCOPE USING ROTATING 1/4 WAVELENGTH PLATE WITH PINHOLE IN THE CENTER POSITION AND FOURIER TRANSFORMED LENS

BACKGROUND OF THE INVENTION

1. Field of the Invention

The present invention relates to a polariscopic phase microscope that can precisely observe a specimen, and more specifically, to a polariscopic phase microscope that can observe a structure and change of a physiological cell by using a phase contrast of light passing through components of the physiological cell.

2. Description of the Related Art

An optical microscope has been mainly used for the purpose of studying in medical and biological fields. A general optical microscope is configured to perform a method that directs light on a specimen, allows the light passing through the specimen to reflect a magnified real image on an objective lens, then re-magnifies the real image through an ocular lens, and observes the re-magnified real image. However, when the general optical microscope observes the biological specimen such as the physiological cell, there is a problem in that it cannot completely perform the observation due to characteristic of the physiological cell, because it is transparent in a visible ray region. As a result, light is not absorbed other than a circumferential portion of the physiological cell. Therefore, microscopes have been developed to completely observe the biological specimen.

An example of such a microscope may include a phase-contrast microscope and an Differential interference microscope (DIC microscope). First, the phase-contrast microscope, which is a microscope devised to be able to observe the biological specimen by using a difference in a refractive index unlike the general optical microscope, observes the biological specimen using a method of a phase contrast generated due to an interference phenomenon between a diffracted beam and a non-diffracted beam as a difference in light and shade.

Meanwhile, the Differential interference microscope is a microscope that can observe the biological specimen using the inference phenomenon of an optical wavelength with a method that overlaps an object light transmitting the specimen with the interference light separated from a light source by using a characteristic that allows an object to delay a light transmitting rate when light passes through the object.

The method that observes the specimen using the phase contrast is an very useful method for a thin specimen. For example, a cultured cell in a test dish is transparent in a visible wavelength and thus, can not be observed by the naked eye. However, there is a slight difference in a refractive index between the cell and an suspension solution around the cell as well as a slight difference between a cytoplasm and a cell sap. The method using the phase contrast can observe the slight refractive index difference as described above by using the optical apparatus. The method transforms the optical path length difference of sample into different light intensities. While the light passes through the cytoplasm, the cell sap, and water, the light path is changed due to the difference in the refractive index.

At this time, if the refractive index increases for one material, the speed of light becomes slow. Therefore, the light wave passing through the cell sap is delayed more than the light wave passing through suspension media such that the following phenomenon occurs. This phenomenon is referred to as a phase change. That is, the light wave is still in an in-phase before the light completely enters the inside of the specimen, but after the light passes through the specimen, the phase of the light wave is changed. Therefore, the phase change depends on the type of materials in the path through which the light passes and the difference of the optical path occurring at the time of transmitting.

The phase-contrast microscope and the differential interference microscope can observe the biological specimen such as the physiological cell, which cannot be observed by the existing optical microscope, by transforming the different phase information into different intensities of light due to the difference in the refractive index. However, since the method using the phase contrast and differential phase contrast provides only qualitative phase information of the cell, there is a problem in that it has a limitation in accurately analyzing the biological specimen quantitatively. Therefore, apparatuses, which can provide quantitative information regarding the biological specimen, have been developed.

To this end, a method capable of imaging the quantitative phase information regarding the biological specimen has been researched. First, an apparatus that measures the phase, phase dispersion, and birefringence of the physiological cell by using an optical coherent tomography (OCT) to extract the quantitative phase information regarding the physiological cell, thereby imaging the inside of the physiological cell, and an apparatus that studies electrical characteristics of the stopped physiological cell and the inside of the physiological cell by using a phase sensitive OCT, and the like have been developed. However, since the apparatuses use a single point measuring method, they have a limitation in view of a measurement speed and there are problems in that they require a high-speed scan apparatus in order to implement the completed image, which causes mechanical noise.

SUMMARY OF THE INVENTION

The present invention proposes to solve the above problems. It is an object of the present invention to provide a polariscopic phase microscope that can acquire quantitative phase information having high transverse resolution and low noise that considers a change in a structure of a physiological cell.

In order to achieve the above object, there is provided a polariscopic phase microscope according to the present invention comprising: an optical image generator that acquires images for a specimen to be observed; an object plane onto which light beams of the images acquired from the optical image generator are projected; a first transform lens that performs primary Fourier transformation on the light beams passing through the object plane; a $\lambda/4$ wavelength plate that is positioned to be spaced at a focal distance of the first transform lens from the first transform lens; a secondary transform lens that performs secondary Fourier transformation on the light beams passing through the $\lambda/4$ wavelength plate; and a phase image generator including a photo detector on which the images of the light beams subjected to the secondary Fourier transformation is focused.

Further, a central portion of the $\lambda/4$ wavelength plate may be provided with holes.

Also, the optical image generator may include a light source that irradiates light having a predetermined intensity, a specimen holder that holds a specimen, an objective lens that collects the light beams passing through the specimen holder, a mirror that transforms a path of the light beams passing through the objective lens, and a tube lens that collects the light beams reflected from the mirror to form intermediate images.

Moreover, the phase image generator may further comprises a polarizer that is provided on a front of the first transform lens in order to selectively transmit the light beams passing through the object plane.

In addition, the polarizer may be coupled with a rotating member in order to rotate the polarizer.

Further, the polarizer may rotates with the step angle of π/4 per rotation.

Also, the photo detector may use a charge-coupled device or a CMOS.

The present invention has an effect that can track even slight changes occurring in a cell unit by acquiring the quantitative phase information having high transverse resolution and low noise of the biological specimen such as the physiological cell that can not normally be observed by the general optical microscope.

BRIEF DESCRIPTION OF THE DRAWINGS

FIG. 1 is a conceptual diagram showing a phase image generator of a polariscopic phase microscope according to an exemplary embodiment of the present invention;

FIG. 2 is a conceptual diagram showing a polariscopic phase microscope according to an exemplary embodiment of the present invention; and FIG. 3 is a plan view of π/4 plate with spatial pinhole according to an exemplary embodiment of the present invention.

DESCRIPTION OF THE PREFERRED EMBODIMENTS

Preferred embodiments of the invention are described hereafter in detail with reference to the accompanying drawings. The reference numerals assigned to components in each figure should be understood first that the same components are referred by the same reference numerals as much as possible, even if they are shown in different figures. Describing the invention herein, when it is considered that detailed description about related known configurations or functions makes the aspects of the invention unclear, the detailed description may be omitted. Further, preferred embodiments of the invention are described hereafter, but it will be apparent to those skilled in the art that various modifications and changes may be made thereto without departing from the scope and spirit of the invention.

FIG. 1 is a conceptual diagram showing a phase image generator according to an exemplary embodiment of the present invention. As shown in FIG. 1, a phase image generator 100 includes an object plane 110, a first transform lens 120, a transform plane 130, a second transform lens 140, and an image plane 150. Reference numeral f1 represents a focal distance of the first transform lens 120 and reference numeral f2 represents a focal distance of the second transform lens 140.

The object plane 110 is a plane that is positioned to be spaced by a pre-focal distance of the first transform lens 120 and has an image focused thereon.

The first transform lens 120 is a portion that performs a primary Fourier transformation on light beams that pass through the object plane 110 and travels.

The transform plane 130, which is positioned to be spaced by a post-focal distance of the first transform lens 120, is a portion on which an image formed by passing through the first transform lens 120 and being subjected to the primary Fourier transformation is focused.

The second transform lens 140 is a portion that is positioned to be spaced by a pre-focal distance of the second transform lens 120 from the transform plane 130 and performs a secondary Fourier transformation on the light beams that pass through the transform plane 130 and then travels.

The image plane 150, which is positioned to be spaced by a post-focal distance of the second transform lens 140, is a portion on which an image formed by being subjected to the secondary Fourier transformation is focused.

The process where the light beams pass through the phase image generator 100 is as follows. First, the light beams from the light source are irradiated on the image positioned at the object plane 110. The light beams starting from the object plane 110 pass through the first transform lens 120 and are subjected to the primary Fourier transform. If the primary Fourier transformation is performed on the light beams in the first transform lens 120, the image in a spatial frequency distribution form for the light beams is focused on the transform plane 130 that is positioned at the post-focal distance of the first transform lens 120. Next, the light beams passing through the transform plane pass through the second transform lens 140 and are subjected to the secondary Fourier transformation. If the secondary Fourier transformation is performed on the light beams in the second transform lens 140, the image subjected to the secondary Fourier transformation is focused on the transform plane 150 that is positioned at the post-focal distance of the second transform lens 140.

The process is performed by the following equation 1.

$$\Im[\Im[g(x,y)]]=g(-x,-y) \qquad \text{[Equation 1]}$$

Herein, g (x, y) represents a coordinate of one point that is positioned at the object plane 110. Equation 1 represents that the image focused on the image plane 150 is implemented in a rotation symmetry state to the image positioned at the object plane 110.

As described above, a 4F system including the first transform lens 120 and the second transform lens 140 of the phase image generator 100 uses the Fourier transformation so that the object and image spatially have the Fourier transform relationship when the object is positioned at the pre-focal distance of the first transform lens 120 and the image is positioned at the post-focal distance. According to the same principle, the image positioned at the pre-focal distance of the second transform lens 140 uses a principle where the image in the same space is focused on the image plane 150 positioned at the post-focal distance of the second transform lens 140 via the second transform lens 140. Thus, it is possible to acquire the image having low noise enlarged through the 4F system.

FIG. 2 is a conceptual diagram showing a polariscopic phase microscope according to an exemplary embodiment of the present invention. As shown in FIG. 2, the polariscopic phase microscope 1 includes the optical image generator 10 and the phase image generator 100. The optical image generator 10 acquires the image for the specimen to be observed and includes a light source 20, a specimen holder 30, an objective lens 40, a reflector 50, a tube lens 60, and a projection lens 70.

The light source 20 generates light beams irradiated on the specimen to be observed. As the light beams for observing the specimen, it is preferable to use a continuous-wave laser to which a single mode optical fiber is coupled in order to assure high coherence and sufficient illumination intensity on the space. The specimen holder 30 positioned at the lower portion of the light source 20 is a portion on which the specimen to be observed is placed and the objective lens positioned at the lower portion of the specimen holder 30 collects the light beams that are irradiated from the light source 20 and pass through the specimen holder 30. The reflector 50 is positioned at the lower portion of the objective lens 40 and reflects the light beams collected in the objective lens 40, thereby performing a role of changing a path of the light beams. The tube lens 60 collects the light beams reflected from the reflector to form an intermediate image. Finally, the projection lens 70 positioned at a rear side of the tube lens collects the light beams passing through the tube lens 60 and forming the intermediate image and travels to the phase image generator 100 side.

The phase image generator 100 performs a role of acquiring the quantitative phase information regarding the specimen from the light beams passing through the optical image generator 10 and includes the object plane 110, a polarizer 115, a rotation member 118, the first transform lens 120, and a wavelength plate 135, the second transform lens 140, a photo detector 155. Reference numeral f1 represents the focal distance of the first transform lens 120 and reference numeral f2 is the focal distance of the second transform lens 140.

The object plane 110 is a portion that is positioned to be spaced by the pre-focal distance of the first transform lens 120 and on which the image of the light beams processed in the optical image generator 10 is focused. The polarizer 115 is positioned between the object plane 110 and the first transform lens 120 and performs a role of selectively transmitting the light beams that pass through the object plane. The rotation member 118 is coupled to the polarizer 115 and performs a role of rotating the polarizer 115. It is preferable that the rotation member 118 is a motor. The first transform lens 120 is a portion that transmits the light beams passing through the polarizer 115 and performs the primary Fourier transformation. The central portion of the wavelength plate 135 positioned to be spaced by the post-focal distance of the first transform lens 120 is formed with micro holes. As the wavelength plate, it is preferable to use a λ/4 wavelength plate. The second transform lens 140 is a portion that transmits the light beams passing through the wavelength plate 135 and is subjected to the secondary Fourier transformation. The photo detector 155 positioned to be spaced by the post-focal distance of the second transform lens 140 is a portion on which the image of the light beams subjected to the secondary Fourier transform is focused and acquires the quantitative phase information regarding the specimen through the image. Preferably, the photo detector 155 is a charge-coupled device (CCD) or a CMOS.

The operational principle of the polariscopic phase microscope 1 is as follows. If the parallel light beams is vertically incident on the specimen coupled to the specimen holder 30 from the light source 20 of the optical image generator 10, the incident light beams are divided into a first light beams that travels in the same direction as the incident light beams and a second light beam that finely deviates travel from the incident direction.

The first light beam and the second light beam are collected by the objective lens 40 and the path thereof is changed into the phase image generator 100 side by the reflector 50, which in turn pass through the object plane 110 of the phase image generator 100 via the tube lens 60 and the projection lens 70. Only the required components of the first light beam and the second light beam passing through the object plane 110 selectively pass through the polarizer 115. The images of the first light beam and the second light beam passing through the polarizer 115 are focused at different positions of the wavelength plate that is positioned to be spaced by the post-focal distance of the first transform lens 120.

Since the first light beam, which is focused on the central portion of the wavelength plate 135, completely passes through the micro hole 138 formed at the central portion of the wavelength plate 135 and the second light beam having the spatial frequency component passes through the wavelength plate 135, the phase change in the first light beam is not generated and the phase of the second light beam is applied in a integer multiple of π/2 every time the polariscopic phase microscope rotates at an integer multiple of π/4.

As described above, the incident axis of the polarizer 115 conforms to an X-axis or a Y-axis of the wavelength plate 135 and the polarizer is then rotated, since it is possible to obtain a plurality of images for the changed phase in the photo detector 155, the phase value is calculated as four sheets of images whose phase is increased by π/2 using the following equation 2.

$$\Phi(x, y) = \tan^{-1}\left[\frac{I_4(x, y) - I_2(x, y)}{I_1(x, y) - I_3(x, y)}\right]$$ [Equation 2]

where $\Phi(x, y)$ is a phase value of two-dimensional coordinates (x, y), $I_1(x, y)$ is an image for the two-dimensional coordinates (x, y) of the image when the polarizer does not rotate, $I_2(x, y)$ is an image for the two-dimensional coordinates (x, y) of the image when the polarizer rotates by π/2, $I_3(x, y)$ is an image for the two-dimensional coordinates (x, y) of the image when the polarizer rotates by π, and $I_4(x, y)$ is an image for the two-dimensional coordinates (x, y) of the image when the polarizer rotates by 3π/2.

As described above, since it is possible to remove unnecessary components of the light beams entering the phase image generator 100 using the 4F system including the polarizer 115 and the wavelength plate 135 and to acquire the phase value for the light beams having the spatial frequency components, it is possible to acquire quantitative phase information having high traverse resolution and low noise for the specimen to be observed in respects to the phase value.

FIG. 3 is a plan view of the wavelength plate according to an exemplary embodiment of the present invention. As shown in FIG. 3, the central portion of the wavelength plate 135 is formed with the micro hole 138 so that the DC component region of the light beams whose images are focused on the central portion completely passes through the micro hole 138 and the region of the light beams having the spatial frequency components passes through the wavelength plate 135. As a result, it is possible to acquire the quantitative phase image in the photo detector 155 through the changed phase with respect to the rotated angle obtained by rotating the polarizer 115.

As described above, although the present invention has been described with reference to the limited embodiments and accompanying drawings, the present invention is not limited to the embodiments and various changes and modification may be made by those skilled in the art. Therefore, the scope of the present invention should not be limited to the above-described embodiments and should be defined by the appended claims and their equivalents.

With the present invention, the quantitative phase information for the specimen to be observed can be acquired and thus, the very delicate change in a cell unit that is hardly observed by the general optical microscope can be tracked. As a result, the present invention can be applied in the biological research field.

What is claimed is:
1. A polariscopic phase microscope comprising:
an optical image generator that acquires images for a specimen to be observed;
an object plane onto which light beams of the images acquired from the optical image generator are projected;

a first transform lens that performs primary Fourier transformation on the light beams passing through the object plane;

a λ/4 wavelength plate that is positioned to be spaced by a focal distance of the first transform lens from the first transform lens;

a secondary transform lens that performs secondary Fourier transformation on the light beams passing through the λ/4 wavelength plate; and a phase image generator including a photo detector on which the images of the light beams subjected to the secondary Fourier transformation is focused.

2. The polariscopic phase microscope according to claim 1, wherein a central portion of the λ/4 wavelength plate is provided with holes.

3. The polariscopic phase microscope according to claim 1, wherein the optical image generator includes a light source that irradiates light having a predetermined intensity, a specimen holder that holds a specimen, an objective lens that collects the light beams passing through the specimen holder, a reflector that transforms a path of the light beams passing through the objective lens, and a tube lens that collects the light beams reflected from the reflector to form intermediate images.

4. The polariscopic phase microscope according to claim 1, wherein the phase image generator further comprises a polarizer that is provided on a front of the first transform lens in order to selectively transmit the light beams passing through the object plane.

5. The polariscopic phase microscope according to claim 4, wherein the polarizer is coupled with a rotating member in order to rotate the polarizer.

6. The polariscopic phase microscope according to claim 4, wherein the polarizer rotates by $\pi/4$ per rotation.

7. The polariscopic phase microscope according to claim 1, wherein the photo detector is a charge-coupled device or a CMOS.

* * * * *